(12) United States Patent
Garcia-Luna-Aceves et al.

(10) Patent No.: US 7,200,111 B2
(45) Date of Patent: Apr. 3, 2007

(54) METHOD FOR IMPROVING TCP PERFORMANCE OVER WIRELESS LINKS

(75) Inventors: Jose Joaquin Garcia-Luna-Aceves, San Mateo, CA (US); Christina Parsa, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 1123 days.

(21) Appl. No.: 09/945,106

(22) Filed: Aug. 30, 2001

(65) Prior Publication Data

US 2002/0089930 A1 Jul. 11, 2002

Related U.S. Application Data

(60) Provisional application No. 60/229,710, filed on Aug. 31, 2000.

(51) Int. Cl.
*G01R 31/08* (2006.01)
(52) U.S. Cl. .............. 370/230; 370/229; 370/231; 370/232; 370/235
(58) Field of Classification Search ........ 370/252, 370/394, 229–235.1, 236
See application file for complete search history.

(56) References Cited

U.S. PATENT DOCUMENTS

| | | | | |
|---|---|---|---|---|
| 5,793,768 A | * | 8/1998 | Keshav | 370/400 |
| 5,974,028 A | * | 10/1999 | Ramakrishnan | 370/229 |
| 6,078,564 A | * | 6/2000 | Lakshman et al. | 370/235 |
| 6,097,697 A | * | 8/2000 | Yao et al. | 370/230 |
| 6,115,357 A | * | 9/2000 | Packer et al. | 370/231 |
| 6,215,769 B1 | * | 4/2001 | Ghani et al. | 370/230 |
| 6,445,681 B1 | * | 9/2002 | Pogrebinsky | 370/252 |
| 6,493,316 B1 | * | 12/2002 | Chapman et al. | 370/231 |
| 6,622,172 B1 | * | 9/2003 | Tam | 709/232 |
| 6,646,987 B1 | * | 11/2003 | Qaddoura | 370/231 |
| 6,700,876 B1 | | 3/2004 | DiNicola et al. | |
| 6,741,555 B1 | * | 5/2004 | Li et al. | 370/229 |
| 6,757,248 B1 | * | 6/2004 | Li et al. | 370/235 |
| 6,898,182 B1 | * | 5/2005 | Cloonan | 370/232 |
| 2001/0032269 A1 | | 10/2001 | Wilson | |

OTHER PUBLICATIONS

Bakre, A. and Badrinath, B.R., "I-TCP: Indirect TCP for Mobile Hosts," In Proceedings of 15th IEEE International Conference on Distributed Computing Systems, pp. 136-143, Vancouver, British Columbia, Canada, May, 1995.

(Continued)

*Primary Examiner*—Seema S. Rao
*Assistant Examiner*—Puneet Bhandari
(74) *Attorney, Agent, or Firm*—John P. O'Banion (57) ABSTRACT

A protocol for differentiating congestion-related packet loss versus random packet loss in a wireless data connection. The protocol monitors changes in the length of a transmission queue in a wireless data connection over an interval substantially equal to the amount of time it takes to transmit a window of data packets and receive acknowledgements corresponding to all data packets transmitted in the window. If packet loss is preceded by an increase in the queue length over two consecutive intervals, the packet loss is designated as being due to congestion and a congestion avoidance algorithm is initiated. Otherwise, the packet loss is designated as random loss and the transmission window is maintained at its current size. The protocol reduces the transmission rate only when congestion is identified as the cause of lost packets; otherwise wireless losses can simply be quickly retransmitted without a reduction in the data transmission rate.

29 Claims, 7 Drawing Sheets

OTHER PUBLICATIONS

Balakrishnan, H. et al., "A Comparison of Mechanisms for Improving TCP Performance Over Wireless Links," IEEE/ACM Transactions on Networking, vol. 6, No. 5; Dec., 1997.

Balakrishnan, H. et al., "Improving Reliable Transport and Handoff Performance in Cellular Wireless Networks," ACM Wireless Networks Journal, vol. 1, No. 4, pp. 1 thru 19, Dec., 1995.

Brakmo, L.S. et al., "TCP Vegas: New Techniques for Congestion Detection and Avoidance," In Proceedings SIGCOMM '94, pp. 1 thru 12, London, United Kingdom, Aug./Sep., 1994.

Brown, Kevin and Singh, Suresh, "M-TCP: TCP for Mobile Cellular Networks," Computer Communication Review, vol. 27, No. 5, pp. 19-43, Oct., 1997.

Caceres, R. and Iftode, L., "Improving the Performance of Reliable Transport Protocols in Mobile Computing Environments," IEEE Journal on Selected Areas in Communication, vol. 13, No. 5, pp. 1 thru 17, 1995.

Chaskar, H. et al., "On the Design of Interfaces for TCP/IP Over Wireless," In MILCOM '96 Conference Proceedings, vol. 1, No. 3, pp. 199-203, Oct., 1996.

Clark, D.D. et al., "NETBLT: A High Throughput Transfer Protocol," In Proceedings SIGCMM, pp. 353-359, Stowe, Vermont, Aug., 1987.

Cobb, J. and Agrawal, P., "Congestion or Corruption? A Strategy for Efficient Wireless TCP Sessions," In Proceedings IEEE Symposium on Computers and Communications. pp. 1 thru 6, Jun., 1996.

Fall, Kevin and Floyd, Sally, "Simulation-Based Comparisons of Tahoe, Reno, and Sack TCP," Computer Communications Review, vol. 26, No. 3, pp. 5-21, Jul., 1996.

Floyd, S. and Jacobson, V., "Random Early Detection Gateways for Congestion Avoidance," IEEE/ACM Transactions on Networking, vol. 4, No. 1, pp. 397-413, Aug., 1993.

Jacobson, R. et al., "TCP Extensions for High Performance," Technical Report, Technical Report No. 1185, pp. 1 thru 37, May, 1992.

Jacobson, V. and Floyd, S., "TCP and Explicit Congestion Notification," Computer Communication Review, vol. 24, No. 5, pp. 8 thru 23, Oct., 1994.

Karn, P. and Partridge, C., "Improving Round-Trip Time Estimates in Reliable Transport Protocols," Computer Communication Review, vol. 17, No. 5, pp. 2 thru 7, Aug., 1987.

Keshav, S., "Packet-Pair Flow Control," pp. 1 thru 45, http://www.es.cornell.edu/skeshav/papers.html.

Lakshman, T.V. et al., "Window-Based Error Recovery and Flow Control With a Slow Acknowledgement Channel: A Study of TCP/IP Performance," In Proceedings IEEE Infocom '97, No. 3, pp. 1199 thru 1209, Apr., 1997.

Lin, D. and Kung, H.T., "TCP Fast Recover Strategies: Analysis and Improvements," In Proceedings IEEE INFOCOM '98, pp. 1 thru 9, Apr., 1998.

Kalampoukas, L. et al., "Explicit Window Adaptation: A Method to Enhance TCP Performance," In Proceedings IEEE INFOCOM '98, pp. 242-251, Apr., 1998. Published at University of California-Santa Cruz on Aug. 21, 1997.

Mathis, M. et al., "TCP Selective Acknowledge Options," Technical Report, Technical Report RFC 2018, pp. 1 thru 12, Oct., 1996.

Samaraweera, N.K.G., "Non-Congestion Packet Loss Detection for TCP Error Recovery Using Wireless Links," IEEE Proceedings-Communications, vol. 146, pp. 222-230, Aug., 1999.

Parsa, C. et al., "Improving TCP Performance Over Wireless Networks at the Link Layer," ACM Mobile Networks and Applications, vol. 5, No. 1, pp. 1 thru 25, Mar., 2000.

Postel, J.B., "Transmission Control Protocol," Technical Report, Information Sciences Institute, Cover + i thru iii + pp. 1 thru 85, RFC 793, Sep., 1981.

Waldby, J. et al., "Total Acknowlegements: A Robust Feedback Mechanism for End-to-End Congestion Control," Sigmetrics '98, Performance Evaluation Review, vol. 26, pp. 1 thru 23, 1998.

Wang, Z. et al., "Eliminating Periodic Packet Losses in the 4.3 Tahoe BSD TCP Congestion Control Algorithm," Computer Communication Review, vol. 22, No. 2, pp. 9 thru 16, Apr., 1992.

Wang, Z. et al., "A New Congestion Control Scheme: Slow Start and Search," Computer Communication Review, vol. 21, No. 1, pp. 32 thru 43, Jan., 1991.

C. Parsa; J.J. Garcia-Luna-Aceves; "Improving TCP Congestion Control Over Internets with Heterogeneous Transmission Media," Proc. IEEE ICNP 1999: 7th International Conference on Network Protocols, Toronto, Canada; p. 1 thru 9; Oct. 31 thru Nov. 3, 1999.

Parsa et al., "Differntiating Congestion vs. Random Loss: A Method for Improving TCP Performance over Wireless Links", Proceedings of the IEEE Conference on Wireless Communications and Networking, Chicago, IL, Sep. 23-28, 2000, pp. 90-93.

Parsa et al., "Improving TCP Congestion Control over Internets with Heterogeneous Transmission Media", Proceedings of the 7th International Conference on Network Protocols (ICNP '99), Ontario, Canada, Oct. 31-Nov. 3, 1999, pp. 213-221.

Cobb et al., "Congestion or Corruption? A Strategy for Efficient Wireless TCP Sessions", Proceedings of the IEEE International Symposium on Computers and Communications, 1995, pp. 262-268.

* cited by examiner

FIG. 3D non-FIFO arrival $D_{j,i}^F = 0$

METHOD FOR IMPROVING TCP PERFORMANCE OVER WIRELESS LINKS

CROSS-REFERENCE TO RELATED APPLICATIONS

This application claims priority from U.S. provisional application Ser. No. 60/229,710 filed on Aug. 31, 2000, incorporated herein by reference.

REFERENCE TO A COMPUTER PROGRAM APPENDIX

Not Applicable

STATEMENT REGARDING FEDERALLY SPONSORED RESEARCH OR DEVELOPMENT

This invention was made with Government support under Grant No. N00014-99-1-0167, awarded by the Office of Naval Research. The Government has certain rights in this invention.

BACKGROUND OF THE INVENTION

1. Field of the Invention

This invention pertains generally to routing data in wireless networks, and more particularly to improving TCP performance in wireless networks by distinguishing congestion versus random loss.

2. Description of the Background Art

The use of wireless information devices to access the Internet and the WWW, in particular, is an ever-increasing practice of mobile users world-wide, resulting in the need for reliable client-server communication over wireless links. Unfortunately, the de-facto Internet protocol for reliability, TCP, has severe performance problems when operated over wireless links.

Recent research has focused on the problems associated with TCP performance in the presence of wireless links and ways to improve its performance. The key issue lies at the very heart of TCP's congestion control algorithms: namely, packet loss is the only detection mechanism for congestion in the network. Wireless links are inherently lossy and, in addition to random losses, they suffer from long periods of fading as well. However, TCP has no mechanism to differentiate these losses from congestion and, therefore, treats all losses as congestive by reducing its transmission window (and in effect halving the throughput of the connection).

Many proposals to improve TCP performance have focused on hiding wireless losses from TCP by performing retransmissions of any lost data before TCP notices the loss. There is far less research on methods for TCP to differentiate between losses due to congestion and those due to noise on a wireless channel.

For example, router-based support for TCP congestion control can be provided through RED gateways, a solution in which packets are dropped in a fair manner (based upon probabilities) once the router buffer reaches a predetermined size. As an alternative to dropping packets, an Explicit Congestion Notification (ECN) bit can be set in the packet header, prompting the source to slow down. However, current TCP implementations do not support the ECN method. An approach has also been proposed that prevents TCP sources from growing their congestion window beyond the bandwidth delay product (BWDP) of the network by allowing the routers to modify the receiver's advertised window field of the TCP header in such a way that TCP does not overrun the intermediate buffers in the network.

End-to-end congestion control approaches can be separated into three categories: using rate control, looking at changes in packet round-trip time (RTT), and modifying the source and/or receiver to return additional information beyond what is specified in the standard TCP header. A problem with rate-control and relying upon RTT estimates is that variations of congestion along the reverse path cannot be identified. Therefore, an increase in RTT due to reverse-path congestion or even link asymmetry will affect the performance of these algorithms in an adverse manner. In the case of RTT monitoring the window size could be decreased (due to increased RTT) resulting in decreased throughput; in the case of rate-based algorithms, the window could be increased in order to bump up throughput, resulting in increased congestion along the forward path.

The DUAL algorithm uses a congestion control scheme that examines the RTT variation as the indication of delay through the network. The algorithm keeps track of the minimum and maximum delay observed to estimate the maximum queue size in the bottleneck routers and keep the window size such that the queues do not fill and thereby cause packet loss. RFC 1185 uses the TCP Options to include a timestamp, in every data packet from sender to receiver in order to obtain a more accurate RTT estimate. The receiver echoes this timestamp in any acknowledgment (ACK) packet and the round-trip time is calculated with a single subtraction. This approach encounters problems when delayed ACKs are used because it is unclear to which packet the timestamp belongs. RFC1185 suggests that the receiver return the earliest timestamp so that the RTT estimate takes into account the delayed ACKs, as segment loss is assumed to be a sign of congestion, and the timestamp returned is from the SN which last advanced the window. When a hole is filled in the sequence space, the receiver returns the timestamp from the segment which filled hole. The downside of this approach is that it cannot provide accurate timestamps when segments are lost.

Two notable rate-control approaches are the Tri-S scheme and TCP Vegas. The Tri-S algorithm is a rate-based scheme that computes the achieved throughput by measuring the RTT for a given window size (which represents the amount of outstanding data in the network). It compares the throughput for a given window and then for the same window increased by one segment. If the throughput is less than one-half that achieved with the smaller window, they reduce the window by one segment. TCP Vegas tries to prevent congestion by estimating the expected throughput and then adjusting the transmission window to keep the actual observed throughput close the expected value.

Another approach is bandwidth probing. In this approach, two back-to-back packets are transmitted through the network and the interarrival time of their acknowledgment packets is measured to determine the bottleneck service rate (the conjecture is that the ACK spacing preserves the data packet spacing). This rate is then used to keep the bottleneck queue at a predetermined value. For the scheme to work, it is assumed that the routers are employing round-robin or some other fair service discipline. The approach does not work over heterogeneous networks, where the capacity of the reverse path could be orders of magnitude slower than the forward path because the data packet spacing is not preserved by the ACK packets. In addition, a receiver could employ a delayed ACK strategy as is common in many TCP implementations, and congestion on the reverse path can interfere with ACK spacing and invalidate the measurements made by the algorithm.

There have also been attempts to differentiate between losses due to congestion and random losses on a wireless link. The proposed method uses variation in round-trip time (RTT) as the mechanism for determining congestion in the network. However, RTT monitoring alone cannot take into account the effects of congestion on the reverse path (as a contributing factor to increased RTT measurements).

Therefore, there is a need for a method of differentiating congestion from random losses on a wireless link that takes into account the effects of congestion on both the forward and reverse paths. The present invention satisfies that need, as well as others, and overcomes deficiencies in current TCP-based techniques.

BRIEF SUMMARY OF THE INVENTION

The present invention is an extension of TCP that is capable of differentiating losses due to congestion from those caused by a lossy wireless link. The present invention is capable of determining congestion on the forward path of the connection and, therefore, can make a more accurate determination of the presence of congestion rather than a simple random loss on a lossy wireless channel.

It cannot be assumed that a reliable link layer or some other method of error recovery exists at the wireless interface; therefore, methods of discovering random wireless losses at the TCP source must be in place. When random losses do occur, there is no need to reduce TCP's transmission rate when the losses are not due to congestion. The present invention, which we refer to herein as "TCP-Santa Cruz", can monitor the queue developing over a bottleneck link and thus determine whether congestion is increasing in the network. It can then identify losses as either congestive or random and respond appropriately.

TCP-Santa Cruz also addresses the issue that applications over the Internet are likely to operate over paths which either exhibit a high degree of asymmetry or, which appear asymmetric due to significant load on the reverse data path. Under such conditions, TCP's method of ACK counting results in significant underutilization of the link with higher capacity due to loss of ACKs on the slow link. ACK loss also leads to very bursty data traffic on the forward path. For this reason, a better congestion control algorithm is needed that is resilient to ACK loss.

TCP-Santa Cruz is a new implementation of TCP that detects not only the initial stages of congestion in the network, but also identifies the direction of congestion; that is, TCP-Santa Cruz determines whether congestion is developing in the forward or reverse path of the connection. TCP-Santa Cruz is then able to isolate the forward throughput from events such as congestion that may occur on the reverse path. By way of example, and not of limitation, congestion is determined by calculating the relative delay that one packet experiences with respect to another as it traverses the network; this relative delay is the foundation of our congestion control algorithm. The relative delay is then used to estimate the number of packets residing in the bottleneck queue; the congestion control algorithm keeps the number of packets in the bottleneck queue at a minimum level by adjusting the TCP source's congestion window. The congestion window is reduced if the bottleneck queue length increases (in response to increasing congestion in the network) and the window is increased when the source detects additional bandwidth availability in the network (i.e., after a decrease in the bottleneck queue length). TCP-Santa Cruz can be implemented as a TCP option by utilizing the extra 40 bytes available in the options field of the TCP header.

The methods used to detect congestion in TCP-Santa Cruz are easily applied to wireless networks and are ideal for distinguishing congestion versus random loss on a wireless link. TCP-Santa Cruz can easily identify a congestive loss as one which is preceded by an increase in the bottleneck queue length. A wireless loss, on the other hand, can be identified as a loss that is not preceded by a buildup in the bottleneck queue. Our protocol monitors changes in the bottleneck queue over an interval substantially equal to the amount of time it takes to transmit one window of data and receive acknowledgments corresponding to all the packets in the window. If a packet is lost during an interval preceded by two consecutive intervals in which the bottleneck queue increased, then we conclude that the loss was due to congestion in the network. At that point the congestion avoidance algorithm is followed and the sender's transmission window is reduced in half. However, if a loss is not preceded by at least two intervals of increasing queue length, we infer that it is a random loss and the congestion avoidance is not reduced. TCP-Santa Cruz reduces the transmission rate only when congestion is identified as the cause of lost packets; otherwise wireless losses can simply be quickly retransmitted without a reduction in the data transmission rate.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

The present invention, which we refer to herein as "TCP-Santa Cruz", can monitor the queue developing over a bottleneck link in a wireless network and thus determine whether congestion is increasing in the network. It can then identify losses as either congestive or random and respond appropriately. The following is a description of a preferred embodiment of the invention. Those skilled in the art will appreciate, however, that the technology may be implemented in alternative embodiments without departing from the invention herein.

TCP-Santa Cruz comprises two major areas of improvement over TCP Reno: congestion control and error recovery. With our error recovery methods we can perform timely and efficient early retransmission of any lost packet, eliminate unnecessary retransmissions for correctly received packets when multiple losses occur within a window of data, and provide RTT estimates during periods of congestion and retransmission, i.e., eliminate the need for Karn's algorithm. The congestion control algorithm allows us to determine when congestion exists in the forward path; a condition which cannot be detected by a round-trip time estimate. This type of monitoring allows us to detect the incipient stages of congestion and to respond to these early warning signs by increasing or decreasing the congestion window. In addition, based upon relative delay calculations, we are able to isolate the forward throughput from any congestion that might be present along the reverse path. The mechanisms in TCP-Santa Cruz used for congestion control and error recovery are described below.

1. Congestion Control

1.1 Eliminating RTT Ambiguity Using Relative Delays

Figure 1:
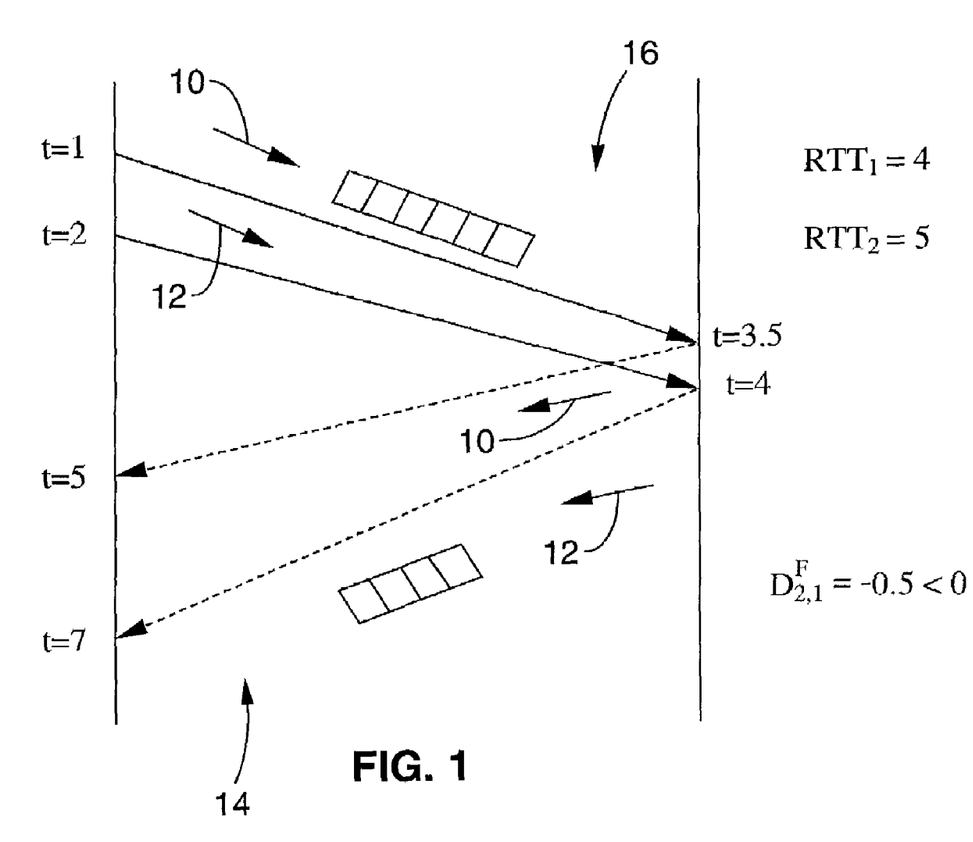
FIG. 1 is a diagram illustrating an example of RTT ambiguity and determination of forward and reverse path queueing.

Round-trip time measurements alone are not sufficient for determining whether data is proceeding along a congested path. FIG. 1 shows an example of the ambiguity involved when only RTT measurements are considered. The example shows the transmission of two packets 10, 12 being sent at times t=1 and t=2, respectively, and the returning acknowledgments from the receiver at t=5 and t=7, respectively. The forward delay, $D^{2,1F}$, between the two packets is −0.05 in this example as depicted by arrival times t=3.5 and t=4, respectively. If only round-trip time (RTT) measurements were used, then measurements $RTT_1$=4 (packet 10) and $RTT_2$=5 (packet 12) could lead to an incorrect conclusion of developing congestion in the forward path for the second packet. The true cause of increased RTT for the second packet is congestion in the reverse path 14, not the data path 16. Our protocol solves this ambiguity by introducing the notion of the relative forward delay. Using this mechanism we will show that in the forward path congestion has actually improved for the second packet.

The congestion control algorithm in TCP-Santa Cruz is based upon changes in the relative delay (increases and decreases in delay that packets experience with respect to each other) as packets are transmitted through the network. The relative delay is calculated from a timestamp returned by the receiver in every acknowledgment packet and specifies the arrival time of the packet at the destination. With relative delay measurements the sender can infer changes that are impossible to determine with a RTT measurements, i.e. the sender can determine whether congestion is increasing or decreasing in either the forward or reverse path of the connection. This determination can be made for every acknowledgment received (including retransmissions).

Figure 2:
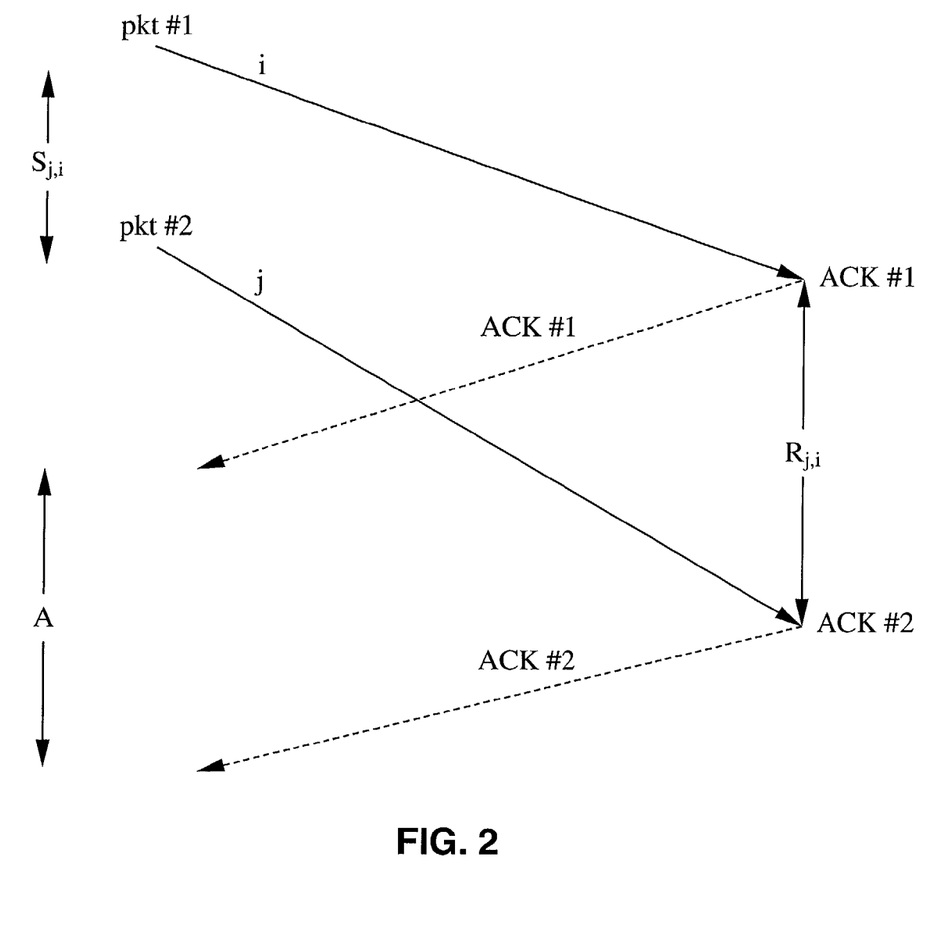
FIG. 2 is a diagram illustrating the transmission of two packets and corresponding relative delay measurements.

FIG. 2 shows the transfer of two sequential packets, labeled pkt #1 (or i) and pkt #2 (or j), transmitted from a source to a receiver. The sender maintains a table with the following times for each packet transmitted: the transmission time of the data packet; the arrival time of an acknowledgment packet for the packet; and the arrival time of the data packet at the destination as reported by the receiver in its acknowledgment. From this information the sender is able to calculate for any two data packets the following time intervals: S, the time interval between the transmission the packets; A, the time between arrival of their acknowledgments at the sender; and R, the inter-arrival time of the data packets at the receiver. From these values, the relative forward delay can be obtained:

$$D^F_{j,i} = R_{j,i} - S_{j,i} \qquad (1.1)$$

where $$D^F_{j,i}$$

represents the additional forward delay experienced by packet j with respect to packet i.

Figure 3A:
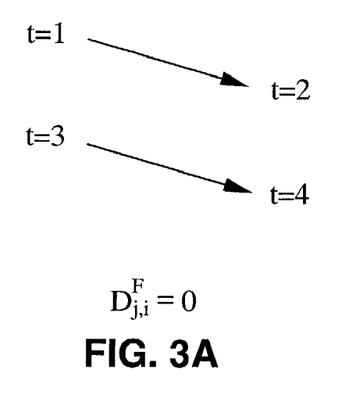
FIG. 3A through FIG. 3D are diagrams illustrating determination of forward path congestion for the packets transmitted as shown in FIG. 2 for the cases of equal delay, $1^{st}$ packet delayed, $2^{nd}$ packet delayed, and non-FIFO arrival of packets, respectively.
Figure 3B:
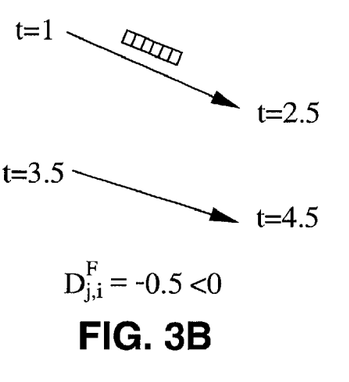

FIG. 3 illustrates how congestion is determined in the forward path. As illustrated in FIG. 3A, when $$D^F_{j,i} = 0$$

the two packets experience the same amount of queuing in the forward path. FIG. 3B shows that the first packet was delayed more than the second packet whenever $$D^F_{j,i} < 0.$$

Figure 3C:
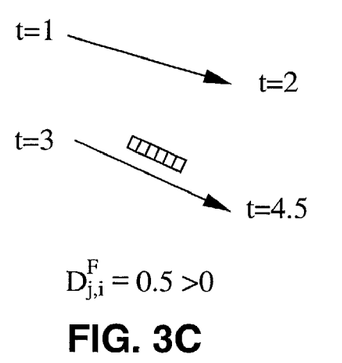

FIG. 3C shows that the second packet has been delayed with respect to the first one when $$D^F_{j,i} > 0.$$

Figure 3D:
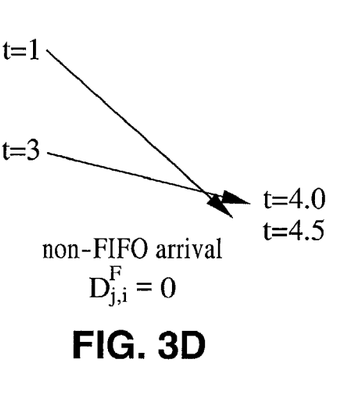

Finally, FIG. 3D illustrates out-of-order arrival at the receiver. In this case the sender is able to determine the presence of multiple paths to the destination by the timestamps returned from the receiver. Note that in the example we have shown measurements for two consecutive packets; however, it is not necessary that the calculations are performed on two sequential packets. If the receiver employs delayed acknowledgments the scheme still works; however, the granularity of measurement is every other packet (or whatever ACK policy is used) instead of on a per packet basis.

When computing the relative delay by comparing the transmission of any two packets, four distinct cases are possible regarding the forward data path: no detected increase in forward path; 1st packet experiences congestion in the forward path; 2nd packet experiences congestion in the forward path; or the packets take alternate routes to the destination (non-FIFO arrival at the receiver).

Figures 4, 5:
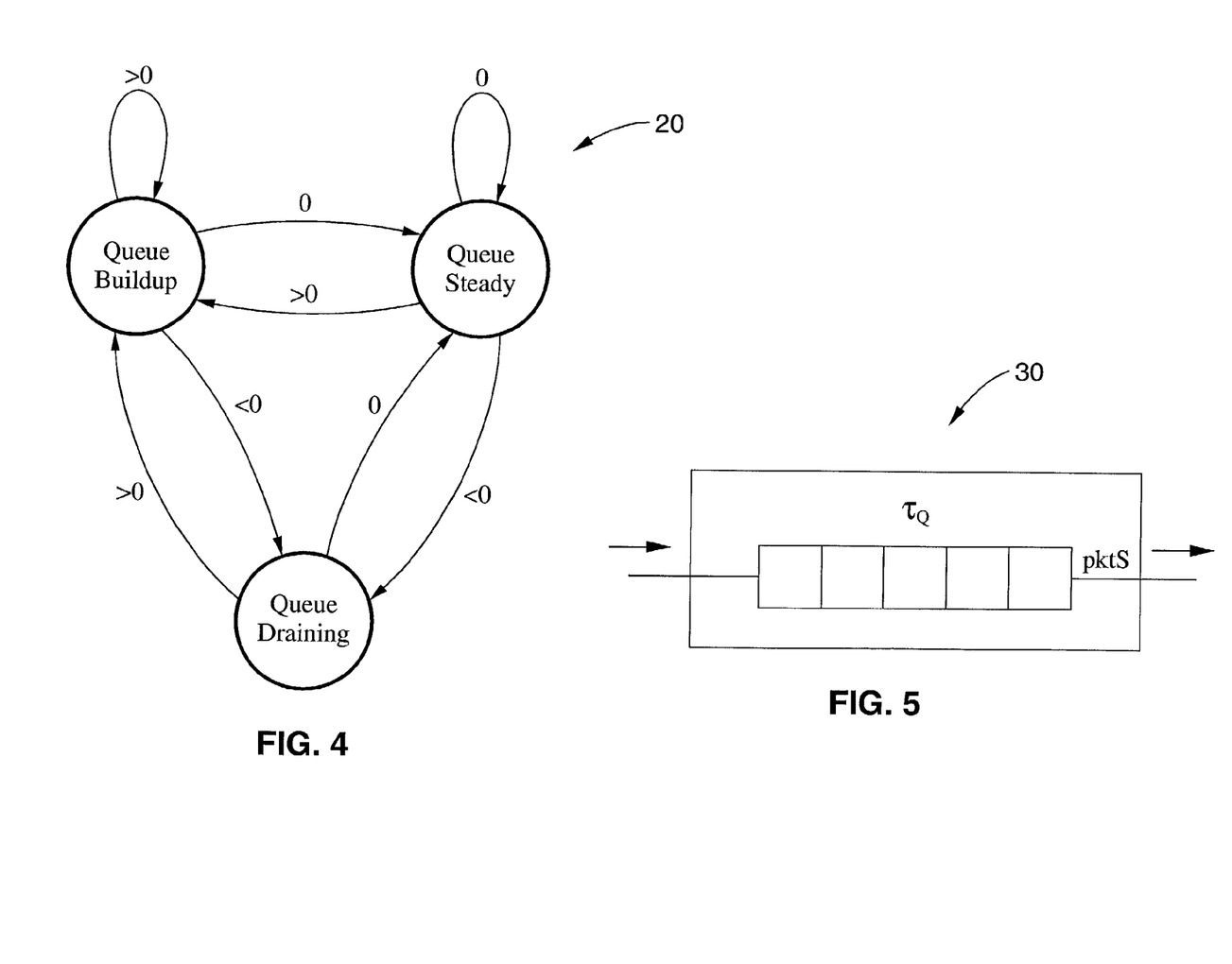
FIG. 4 is a state diagram illustrating the determination of whether a Queue is filling, draining or maintaining based on the value of $D^F_{j,i}$.
FIG. 5 is a diagram depicting a bottleneck link where delay consists of $\tau_Q$ which is the delay due to queueing and pktS, which is the packet service time over the link.

At any time during the connection, the queues (and specifically the bottleneck queue) is in one of three states: increasing in size, decreasing or maintaining its current state. FIG. 4 shows via a state diagram 20 how the computation of the relative forward delay, $$D_{j,i}^F,$$

provides information about the bottleneck queue and allows an easy determination of change in queue state based upon calculations of $$D_{j,i}^F$$

overtime. The goal in TCP-Santa Cruz is to allow the network queues (specifically the bottleneck queue) to grow to a desired size; the specific algorithm to achieve this goal is described next.

1.2 Congestion Control Algorithm

Summing the relative delay measurements over a period of data flow gives us an indication of the level of queuing at the bottleneck. If the sum of relative delays over an interval was zero, we would know that no additional congestion or queuing was present in the network at the end of the interval with respect to the beginning. Likewise, if we were to sum from the beginning of a session, and at any point if the summation was equal to zero, we would know that all of the data was contained in the links and not in the network queues. The congestion control algorithm of TCP-Santa Cruz operates by summing the relative delays from the beginning of a session, and then updating the measurements at intervals equal to the amount of time to transmit a windowful of data and receive the corresponding ACKs. The relative delay sum is then translated into the equivalent number of packets (queued at the bottleneck) represented by the sum of relative delays. In other words, the algorithm attempts to maintain the following condition:

$$N_{t_j} = n \quad (1.2)$$

where $$N_{t_j} = N_{t_{i-1}} + M_{W_{i-1}} \quad (1.3)$$

and $N_{t_j}$ is the total number of packets queued at the bottleneck from the beginning of the connection until $t_j$; n is the desired number of packets, per session, to be queued at the bottleneck; $M_{W_{i-1}}$ is the additional amount of queuing introduced over the previous window $W_{i-1}$; and $N_{t_{i-1}} = M_{W_0}$.

1.2.1 The Operating Point

The operating point n is the desired number of packets to reside in the bottleneck queue. n should greater than zero; the intuition behind this decision is that an operating point equal to zero would lead to underutilization of the available bandwidth because the queues are always empty, i.e., no queuing is tolerated. Instead, the goal is to provide a small amount of queuing so that a packet is always available for forwarding over the bottleneck link. For example, if we choose n=1, then we expect a session to maintain one packet in the bottleneck queue, i.e., our ideal or desired congestion window would be one packet above the bandwidth delay product (BWDP) of the network.

1.2.2 Translating the Relative Delay

The relative delay gives us a sense of the change in queuing, but it tells us nothing about the actual number of packets represented by this number. We translate the sum of relative delays into the equivalent number of queued packets by first calculating the average packet service time (sec/pkt) achieved by a session over an interval. This rate over the forward path is of course limited by the bottleneck link. Our model of the bottleneck link 30, depicted in FIG. 5, consists of two delay parameters: queuing delay, $\tau Q$; and output service time, pktS, the amount of time to service a packet. The queuing delay is variable and is controlled by the congestion control algorithm by changing the sender's congestion window. We get a sense of this value with the relative delay measurements. The output rate of a FIFO queue will vary according to the number of sessions and the burstiness of the arrivals from various sessions. The packet service rate is calculated as $$pktS = \frac{R}{\text{\# packets received}},$$

where R is the difference in arrival time of the two packets as calculated from the timestamps returned by the receiver. Because this rate changes throughout an interval, we calculate the average packet service time, $\overline{pktS}$ over the interval. Finally, we translate the accumulated relative delays over the interval into the equivalent number of packets by dividing the amount of time a packet is delayed with respect to another (relative delay) by the average time to service a packet to obtain the number of packets represented by the delay:

$$M_{W_{i-1}} = \frac{\sum D_k^F}{\overline{pktS}} \quad (1.4)$$

where k are packet-pairs within window $W_{i-1}$. The total queuing at the end of the interval is determined by Equations 1.2 and 1.3.

1.2.3 Adjusting the Window

We attempt to keep the SC-TCP congestion window such that Equation 1.2 is satisfied within a range of n±δ, where δ is some fraction of a packet. Adjustments are made to the congestion window only at discrete intervals, i.e., in the time taken to empty a windowful of data from the network. Over this interval, $M_{W_{i-1}}$ is calculated and at the end of the interval it is added to $N_{t_{i-1}}$. If the result falls within the range of n±δ, the congestion window is maintained at its current size. If, however, $N_{t_j}$ falls below n−δ, the system is not being pushed enough and the window is increased linearly during the next interval. If $N_{t_j}$ rises above n+δ, then the system is being pushed too high above our desired operating point, and the congestion window is decreased linearly during the next interval.

In TCP Reno the congestion control algorithm is driven by the arrival of ACKs at the source (the window is incremented by 1/cwnd for each ACK while in the congestion avoidance phase) and is for this reason adversely affected by ACK loss. ACK loss becomes a predominant feature in TCP over asymmetric networks. Because our congestion control algorithm makes adjustments to the window based upon the advancement of the window and not on the arrival of ACKs in general, the algorithm is robust to ACK loss.

1.2.4 Startup

Currently, the algorithm used by TCP at startup is the slow start algorithm used by TCP Reno with two modifications: the initial cwnd is set to two segments instead on one so that initial values for $$D_{i,j}^F$$

can be calculated and the algorithm may stop slow start before ssthresh>cwnd if any relative delay measurement or $N_{t_j}$ exceeds n/2. During slow start the congestion window doubles every round-trip time, leading to an exponential growth in the congestion window. Many divergent problems have been identified with slow start. On the one hand, the algorithm actually causes the congestion window to grow very quickly and such rapid growth often leads to congestion in the data path. This is the approach taken by TCP Reno to find the optimal window size. In contrast, for connections with very high bandwidth delay products, slow start is actually too slow, and if a transfer is very short it is possible that the pipe is never filled, which leads to underutilization of the network and renders short transfers very expensive.

Figure 6:
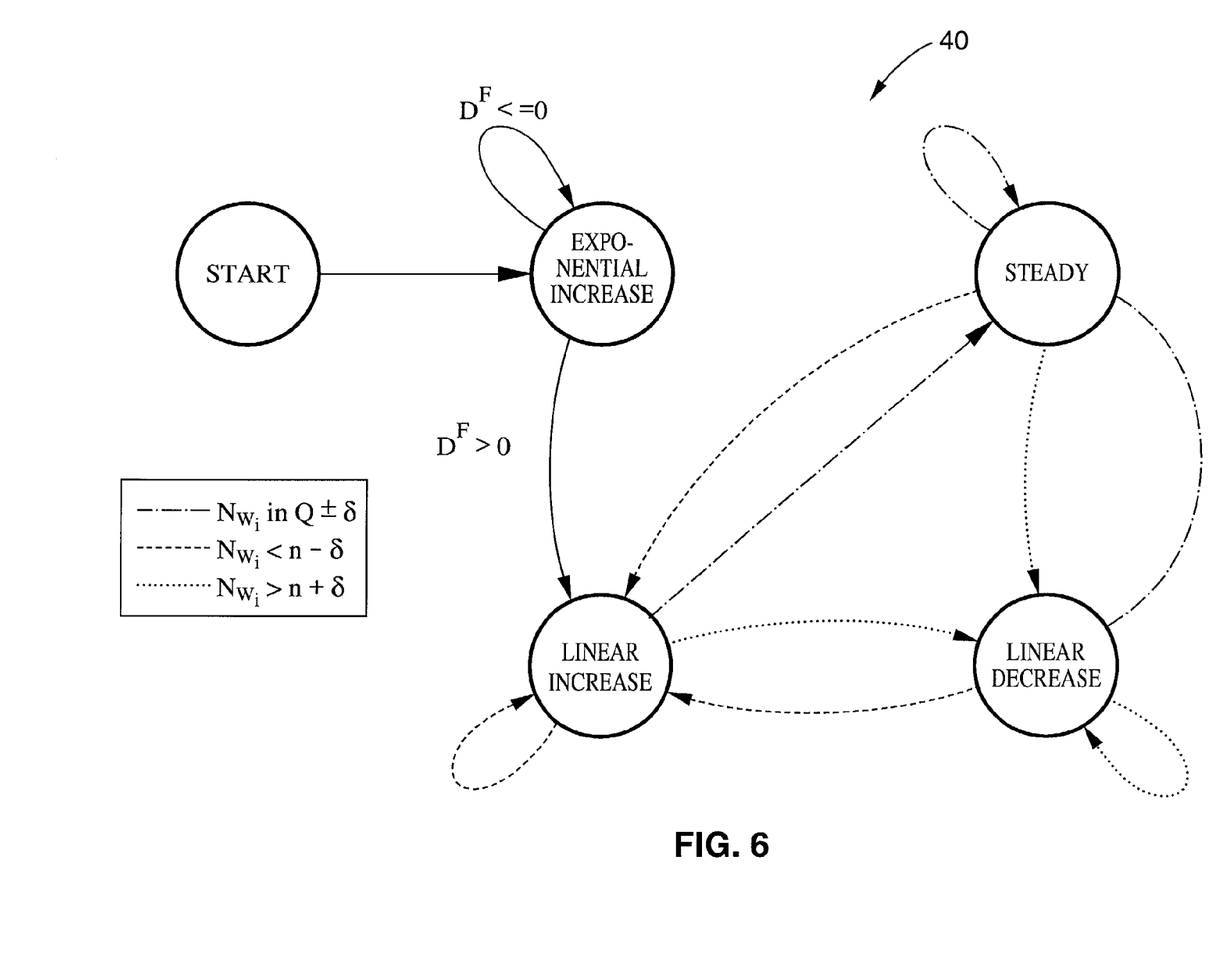
FIG. 6 is a state diagram illustrating the congestion avoidance policy and slow start followed by the present invention.

In TCP-Santa Cruz, slow start is stopped as soon as any congestion is identified in the forward path, i.e. as soon as $$D_{i,j}^F > 0$$

for any measurement, we stop the exponential increase and move to our congestion avoidance algorithm. Once stopped, slow start begins again only if a timeout occurs. The complete state diagram 40 showing the adjustment of the congestion window during startup and congestion avoidance is shown in FIG. 6.

2. Error Recovery

2.1 Improved RTT Estimate

TCP-Santa Cruz provides an improved RTT estimate over traditional TCP approaches, as well as TCP Vegas, by measuring the round-trip time (RTT) of every segment transmitted. RTT estimates are made for every packet for which an acknowledgment (ACK) is received, including retransmissions. This eliminates the need for Karn's algorithm (in which RTT measurements are not made for retransmissions) and timer-backoff strategies (in which the timeout value is essentially doubled after every timeout and retransmission).

To accomplish the above, TCP-Santa Cruz requires each returning acknowledgment packet to indicate the precise packet that caused the ACK to be generated and the sender must keep a timestamp, for each transmitted packet. The precise packet can be uniquely identified by specifying both a sequence number and a transmission copy number. For example, the first transmission of packet "1" is specified as "1.1", the second transmission is labeled "1.2", etc. In this way, it is possible for the sender to perform a new round-trip time estimate for every acknowledgment it receives. Therefore, acknowledgments from the receiver are logically a 3-tuple consisting of a cumulative acknowledgment (indicating the sequence number of the highest in-order packet received so fax), and the 2-element sequence number of the packet generating the ACK (usually the most recently received packet). For example, acknowledgment "5.7.2" indicates a cumulative acknowledgment of "5" and the current acknowledgment was generated by the second transmission of a packet with sequence number "7".

As with traditional TCP, we do not want the RTT estimate to be updated too quickly; therefore, a weighted average is computed for each new value received. We use the same algorithm as TCP; however, the computation is performed for every acknowledgment received, instead of once per round-trip time.

3. Discovering Wireless Losses

As congestion develops in a wired network, data packets fill the network links. If the rate of data entering the network continues to increase, data packets fill the network queues until the queues reach capacity and the routers begin to drop packets. In other words, losses due to congestion are preceded by an increase in the network bottleneck queue. The basic methods used to detect congestion in TCP-Santa Cruz are easily applied to networks containing wireless links and are ideal for distinguishing congestion versus random loss in a network which may or may not contain a wireless link.

TCP-Santa Cruz easily identifies a congestive loss as one which is preceded by an increase in the bottleneck queue length. A wireless loss, on the other hand, can be identified as a random loss that is not preceded by a buildup in the bottleneck queue. TCP-Santa Cruz monitors changes in the bottleneck queue over an interval equal to the amount of time it takes to transmit one window of data and receive acknowledgements corresponding to all the packets transmitted in the window.

Figure 7:
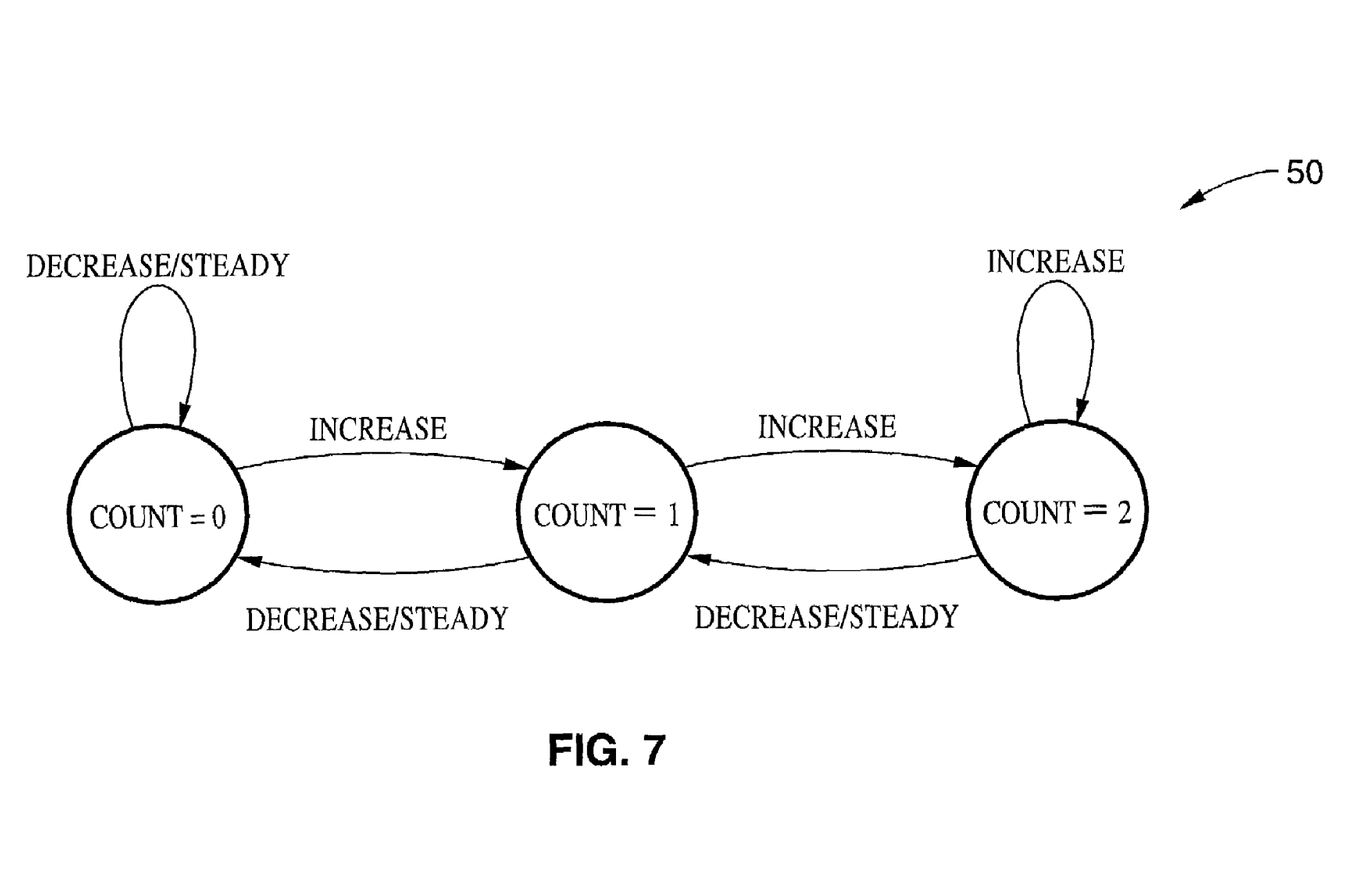
FIG. 7 is a state diagram illustrating monitoring buildup of network queue interval according to the present invention.

FIG. 7 is a state diagram 50 that shows how the protocol counts intervals of queue buildup. The protocol starts in state count=0 which means we have not noticed an interval in which the bottleneck queue increased. Once an interval experiences an increase in queue length, we transition to the state count=1. An interval with a decrease or steady queue size causes a transition back. Finally, if a loss occurs in state count=2, we conclude that the loss was due to congestion. At that point, the congestion avoidance algorithm is followed and the sender's transmission window is reduced in half. However, if a loss is not preceded by at least two consecutive intervals of increasing queue length, we infer that it is a random loss and the congestion avoidance algorithm is not followed and the transmission window is maintained at its current size. We have chosen the constraint of two intervals of increasing queue length (instead of just one) as the signal for congestion in order to avoid any noise in the network. It may also be possible to use other values. TCP-Santa Cruz reduces the transmission rate only when congestion is identified as the cause of lost packets; otherwise, wireless losses can simply be retransmitted without a reduction in the data transmission rate.

3.1 ACK Window

To assist in the identification and recovery of lost packets, the receiver in TCP-SC returns an ACK Window to the sender to indicate any holes in the received sequential stream. The ACK Window is similar to the bit vectors used in previous protocols, such as NETBLT and TCP-SACK. However, unlike TCP-SACK our approach provides a new mechanism whereby the receiver is able to report the status of every packet within the current transmission window. Note that TCP-SACK is generally limited by the TCP options field to reporting only three sections of continuous data within a window. The ACK Window is maintained as a vector in which each bit represents the receipt of a specified number of bytes beyond the cumulative acknowledgment. The receiver determines an optimal granularity for bits in the vector and indicates this value to the sender via a one-byte field in the header. A maximum of 19 bytes are available for the ACK window in order to meet the 40-byte limit of the TCP option field in the TCP header. The granularity of the bits in the window is bounded by the receiver's advertised window and the 19 bytes available for the ACK window; this can accommodate a 64K window with each bit representing 450 bytes. Ideally, a bit in the vector would represent the MSS of the connection, or the typical packet size. Note this approach is meant for data intensive traffic, therefore bits represent at least 50 bytes of data. If there are no holes in the expected sequential stream at the receiver, then the ACK window is not generated.

Figure 8:
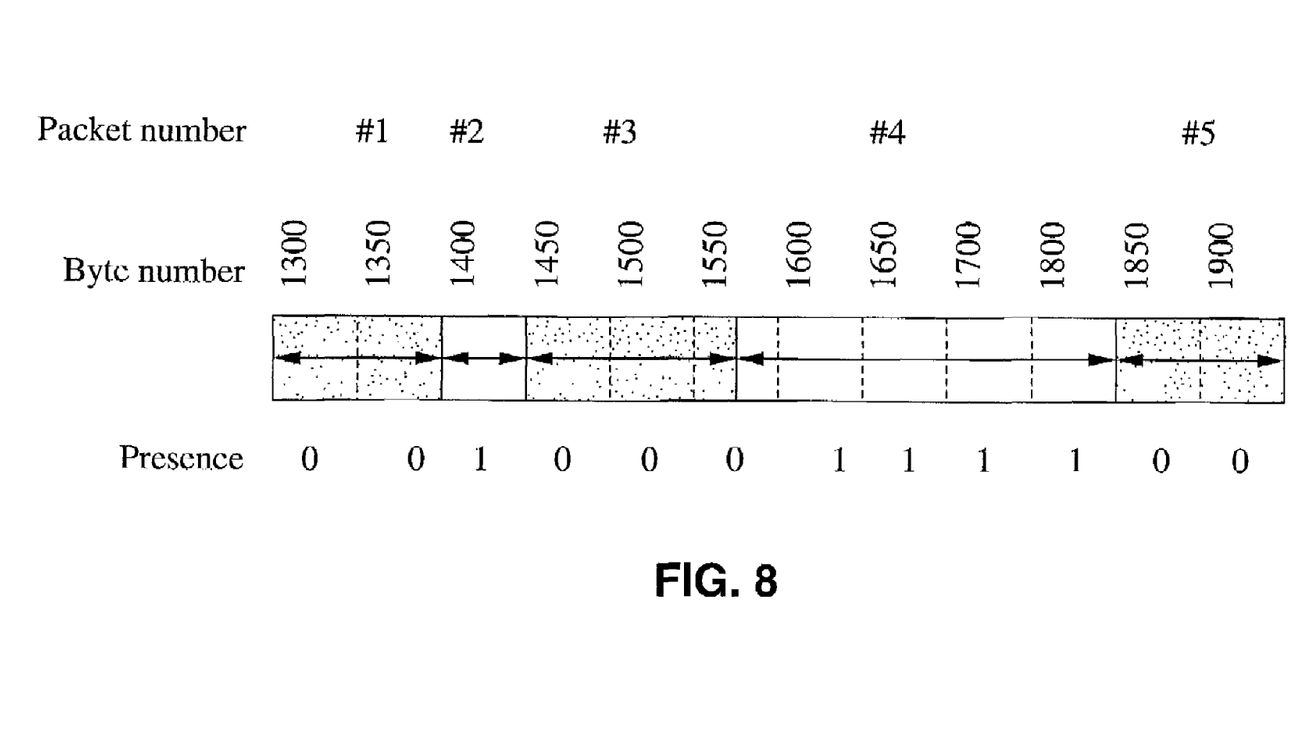
FIG. 8 is a diagram showing a ACK window transmitted from a receiver to sender wherein packets #1, #3 and #5 are lost.

FIG. 8 shows the transmission of five packets, #1, #2, #3, #4, #5, three of which (#1, #3, and #5) are lost and are shown using a stipple pattern. The packets are of variable size and the length of each is indicated by a horizontal arrow. Each bit in the ACK window represents 50 bytes with a "1" if the bytes are present at the receiver and a "0" if they are missing. Once packet #2 is recovered, the receiver would generate a cumulative acknowledgment of "1449" and the bit vector would indicate positive acknowledgments for bytes "1600" through "1849". There is some ambiguity for packets "3" and "4" since the ACK window shows that bytes "1550" through "1599" are missing. The sender knows that this range includes packets "3" and "4" and is able to infer that packet "3" is lost and packet "4" has been received correctly. The sender maintains the information returned in the ACK Window, flushing it only when the window advances. This helps to prevent the unnecessary retransmission of correctly received packets following a timeout when the session enters slow start.

3.2 Retransmission Policy

Our retransmission strategy is motivated by such evidence as Internet trace reports which show that 85% of TCP timeouts are due to non-trigger. Non-trigger is when a packet is retransmitted by the sender without previous attempts, i.e., TCP's fast retransmission mechanism never happened. For this reason we need to quickly recover losses without necessarily waiting for three duplicate acknowledgments from the receiver.

Given that TCP-Santa Cruz has a much tighter estimate of the RTT time per packet and that the TCP-Santa Cruz sender receives precise information on each packet correctly received, TCP-Santa Cruz is able to determine when a packet has been dropped and can avoid waiting for TCP's Fast Retransmit algorithm and quickly retransmit and recover a lost packet once any ACK for a subsequently transmitted packet is properly received and a time constraint is met.

Suppose packet i, initially transmitted at time $t_i$, is lost and is marked as a hole in the ACK window. Packet i can be retransmitted as soon as an acknowledgment arrives for any packet transmitted at time $t_x$, such that $t_x > t_i$, and $t_{current} - t_i > RTT_e$, where $t_{current}$ is the current time and $RTT_e$ is the estimated round-trip time of the connection. Any packet which is marked as unreceived in the ACK window can be a candidate for early retransmission.

4. Implementation

TCP-Santa Cruz can be implemented as a TCP option containing the fields depicted in Table 1. The TCP-SC option can vary in size from 11 bytes to 40 bytes, depending on the size of the acknowledgment window (see Section 3.1).

5. Performance Results

We compared the performance of TCP-Santa Cruz to TCP Reno over a network consisting of wired network segments (representing the Internet) connected to a base station on a wireless LAN. We performed FTP transfers from an Internet server to a wireless host for a variety of wireless link error rates. At a low wireless bit error rate of $1 \times 10^{-6}$, on average 1 out of every 125 packets were dropped on the wireless link for both the TCP-Santa Cruz and TCP Reno transfers. Each simulation was run for 60 seconds.

As explained above, FIG. 7 illustrates how TCP-Santa Cruz counts the consecutive intervals over which it notices a bottleneck queue increases in order to determine if congestion is present when a loss is detected. In our test we found that the value of count was rarely equal to two, which would indicate that nearly all losses on the wireless link would be considered as random by the protocol. In other words, once the losses are discovered, we expect the protocol to simply retransmit most losses without reducing the transmission window.

We noticed that for TCP-Santa Cruz the congestion window never dropped to half of its value when these losses occurred on the wireless link, verifying that, in this simulation, TCP-Santa Cruz correctly identified all losses as random losses and not due to congestion. There was one instance, however, where we noted a TCP timeout because a retransmitted packet was once again dropped on the wireless link.

The simulation was run with n=4, which means that TCP-Santa Cruz would try to fill the bit pipe and maintain an extra 4 packets in the bottleneck queue (at the base station). We found that TCP-Santa Cruz maintained its window around 10 packets, exactly the BWDP (6 packets) plus the extra 4 packets in the queue. This steady value of the congestion window is directly correlated to the number of packets in the bottleneck queue. On the other hand, we found that the congestion window for TCP Reno oscillated wildly between 1 and 25 packets (ant at times up to 60 packets during the Fast Recovery phase). This variation in the congestion window was directly responsible for long end-to-end delays experienced by transfers using TCP Reno.

We found that the delay experienced by packets in TCP-Santa Cruz to be roughly half the delay with TCP Reno. In addition, the variance in delay was an order of magnitude smaller. Because TCP Reno keeps so many packets in the bottleneck queue, each packet experiences a considerable amount of queueing before it is transmitted over the wireless link. The only time packets experience low delay is immediately following either a timeout (when the congestion window is reduced to one segment) or after a fast retransmit (when the congestion window is cut in half). Shortly thereafter the queue again builds and the delay once again increases.

With respect to throughput it is important to mention that for this error rate, TCP Reno did not experience an appreciable reduction in throughput because it was able to recover most errors via the fast transmission mechanism and therefore was able to keep its window large enough to fill the bit pipe of the connection.

We also performed simulations for a variety of link error rates. The error rates were increased from $1 \times 10^{-6}$ to $1 \times 10^{-5}$ (corresponding to 1 packet loss per 12.5 packets). We found that TCP-Santa Cruz proved higher throughput than TCP Reno in all cases. If fact, we found that the throughput of TCP-Santa Cruz did not drop significant until very high errors rates (e.g., 1 packet per 12.5). This drop was due to the fact that so many of the retransmissions were also subsequently dropped. The current code in this case defaults to a timeout for the second retransmission, but it would be possible to check on the status of the retransmitted packet whenever an ACK arrives because TCP-Santa Cruz keeps a timestamp for every transmission. This would improve performance for these catastrophic error rates.

With regard to changes in end-to-end delay with increases in error rate, TCP Reno experienced a very large delay variance at the rate 1/12.5 packet loss. This was because packets either make it though quickly with a small bottleneck queue, or they experience a long delay due to timeouts. The delay in TCP-Santa Cruz, however, was fairly steady until the large error rate at which time so many dropped packets were also dropped on the retransmission that timeouts were experienced as well.

Through our tests, we demonstrated that our algorithm is able to correctly differentiate between random losses and congestion losses. TCP-Santa Cruz is able to maintain high throughput over the wireless link because it does not reduce its sending rate when the losses are determined to be due to the wireless link. TCP Reno, on the other hand, can make no such distinction and as a result performs very poorly, even when link error rates are low. TCP-Santa Cruz also produces reduced delay and delay variation from source to receiver because it keeps the bottleneck queue at a minimum level and does not create the oscillations in bottleneck queue length that is typical of the TCP Reno transmission pattern. Additional details regarding TCP-Santa Cruz and its performance can be found in C. Parsa and J. J. Garcia-Luna-Aceves, "Improving TCP Congestion Control Over Internets with Heterogeneous Transmission Media," Proc. IEEE ICNP 99: 7th International Conference on Network Protocols, Toronto, Canada, Oct. 31–Nov. 3, 1999, incorporated herein by reference.

6. Advantages and Improvements Over Existing Practice

TCP-Santa Cruz makes use of a simple timestamp returned from the receiver to estimate the level of queuing in the bottleneck link of a connection. The protocol successfully isolates the forward throughput of the connection from events on the reverse link by considering the changes in delay along the forward link only. We successfully decouple the growth of the congestion window from the number of returned ACKs (the approach taken by TCP), which makes the protocol resilient to ACK loss. The protocol provides quick and efficient error-recovery by identifying losses via an ACK window without waiting for three duplicate acknowledgments. An RTT estimate for every packet transmitted (including retransmissions) allows the protocol to recover from lost retransmissions without using timer-backoff strategies. TCP-Santa Cruz is the only protocol to date that can accurately determine random wireless losses by monitoring the increase in queue length along the forward path of a connection. In this way, there is no chance for fluctuations in congestion along the reverse path in influence our determination of congestion along the forward path.

Simulation results show that TCP-Santa Cruz provides high throughput and low end-to-end delay and delay variance over networks with a simple bottleneck link, networks with congestion in the reverse path of the connection, and networks which exhibit path asymmetry. We have shown that TCP-Santa Cruz eliminates the oscillations in the congestion window, but still maintains high link utilization. As a result, it provides much lower delays than current TCP implementations. For the simple bottleneck configuration our protocol provides a 20% –39% improvement in end-to-end delay (depending on the value of n) and a delay variance three orders of magnitude lower than TCP Reno. For experiments with congestion on the reverse path, TCP-Santa Cruz provides an improvement in throughput of at least 47% –67% over both TCP Reno and TCP Vegas, as well as an improvement in end-to-end delay of 45% to 59% over TCP Reno with a reduction in delay variance of three orders of magnitude. When we examine networks with path asymmetry, TCP Reno and TCP Vegas achieve link utilization of only 52% and 33%, respectively, whereas TCP-Santa Cruz achieves 99% utilization. End-to-end delays for this configuration are also reduced by 42% –58% over TCP Reno.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

TCP-Santa Cruz Options Field Description

| Field | Size (bytes) | Description |
| --- | --- | --- |
| Kind | 1 | kind of protocol |
| Data.copy | 4 (bits) | retransmission number data packet |
| ACK.copy | 4 (bits) | retransmission number of data packet generating ACK |
| ACK.sn | 4 | sequence number of data packet generating ACK |
| Timestamp | 4 | arrival time of data packet generating ACK |
| Bit Vector Granularity | 1 | number of bytes in each bit |
| ACK Window | 0–19 | indicates hole in the receive stream |

What is claimed is:

1. A method for differentiating congestion-related packet loss versus random packet loss in a wireless data connection, comprising:
   monitoring changes in the length of a transmission queue in a wireless data connection;
   designating packet loss as being due to congestion if said packet loss is preceded by an increase in the queue length;

designating packet loss as random loss if said packet loss is not preceded by an increase in the queue length;
monitoring changes in the length of said queue over an interval substantially equal to the amount of time it takes to transmit a window of data packets and receive acknowledgements corresponding to all data packets transmitted in the window;
initializing a state count to zero;
transitioning from the state count zero to state count one if the length of said queue increases during the next interval;
transitioning from the state count one to state count zero if the length of said queue decreases or remains steady during the next subsequent interval;
transitioning from state count one to state count two if the length of said queue increases during the next subsequent interval; and
designating packet loss as due to congestion if state count two is reached.

2. A method as recited in claim 1, further comprising:
applying a collision avoidance algorithm if packet loss is designated as due to congestion.

3. A method as recited in claim 2, wherein said collision avoidance algorithm comprises reducing the sender's transmission window by one-half.

4. A method for differentiating congestion-related packet loss versus random packet loss in a wireless data connection, comprising:
monitoring changes in the length of a transmission queue in a wireless data connection;
designating packet loss as being due to congestion if said packet loss is preceded by an increase in the queue length;
designating packet loss as random loss if said packet loss is not preceded by an increase in the queue length;
determining whether congestion is developing in the forward or reverse path of the connection; and
isolating forward throughput from congestion on the reverse path;
wherein congestion is determined by calculating the relative delay that one packet experiences with respect to another as it traverses the connection.

5. A method as recited in claim 4, wherein said relative delay is used to estimate the number of packets residing the in the queue.

6. A method as recited in claim 5, further comprising keeping the number of packets in the queue at a minimum level by adjusting a congestion window.

7. A method as recited in claim 6, further comprising:
reducing the congestion window if the queue length increases; and
increasing the congestion window if the queue length decreases.

8. A TCP-based congestion management protocol for a wireless data connection, comprising:
monitoring changes in a length of a transmission queue in a data connection;
designating packet loss as being due to congestion if said packet loss is preceded by at least two consecutive intervals of increasing queue length; and
designating packet loss as random loss if said packet loss is not preceded by at least two consecutive intervals of increasing queue length;
applying a collision avoidance algorithm if packet loss is designated as due to congestion;
wherein each said interval comprises the amount of time it takes to transmit a window of data packets and receive acknowledgements corresponding to all data packets transmitted in the window;
wherein collision avoidance algorithm comprises
reducing the sender's transmission window by one-half;
initializing a state count to zero;
transitioning from a state count zero to state count one if the length of said queue increases during the next interval;
transitioning from the state count one to state count zero if the length of said queue decreases or remains steady during next subsequent interval;
transitioning from a state count one to state count two if the length of said queue increases during the next subsequent interval; and
designating packet loss as due to congestion if state count two is reached.

9. A protocol as recited in claim 8, further comprising determining whether congestion is developing in the forward or reverse path of the connection.

10. A protocol as recited in claim 9, further comprising isolating forward throughput from congestion on the reverse path.

11. A protocol as recited in claim 10, wherein congestion is determined by calculating the relative delay that one packet experiences with respect to another as it traverses the connection.

12. A protocol as recited in claim 11, wherein said relative delay is used to estimate the number of packets residing the in the queue.

13. A protocol as recited in claim 12, further comprising keeping the number of packets in the queue at a minimum level by adjusting a congestion window.

14. A protocol as recited in claim 13, further comprising:
reducing the congestion window if the queue length increases; and
increasing the congestion window if the queue length decreases.

15. A method for differentiating congestion-related packet loss versus random packet loss in a wireless data connection, comprising:
monitoring changes in the length of a transmission queue in a wireless data connection over an interval substantially equal to the amount of time it takes to transmit a window of data packets and receive acknowledgements corresponding to all data packets transmitted in the window;
designating packet loss as being due to congestion if said packet loss is preceded by an increase in the queue length;
designating packet loss as random loss if said packet loss is not preceded by an increase in the queue length;
initializing a state count to zero;
transitioning from the state count zero to state count one if the length of said queue increases during the next interval;
transitioning from the state count one to state count zero if the length of said queue decreases or remains steady during the next subsequent interval;
transitioning from state count one to state count two if the length of said queue increases during the next subsequent interval; and
designating packet loss as due to congestion if state count two is reached.

16. A method as recited in claim 15, further comprising:
applying a collision avoidance algorithm if packet loss is designated as due to congestion.

17. A method as recited in claim 16, wherein said collision avoidance algorithm comprises reducing the senders transmission window by one-half.

18. A method for differentiating congestion-related packet loss versus random packet loss in a wireless data connection, comprising:
   monitoring changes in the length of a transmission queue in a wireless data connection over an interval substantially equal to the amount of time it takes to transmit a window of data packets and receive acknowledgements corresponding to all data packets transmitted in the window;
   designating packet loss as being due to congestion if said packet loss is preceded by an increase in the queue length;
   designating packet loss as random loss if said packet loss is not preceded by an increase in the queue length;
   determining whether congestion is developing in the forward or reverse path of the connection; and
   isolating forward throughout from congestion on the reverse path;
   wherein congestion is determined by calculating the relative delay that one packet experiences with respect to another as it traverses the connection.

19. A method as recited in claim 18, wherein said relative delay is used to estimate the number of packets residing the in the queue.

20. A method as recited in claim 19, further comprising keeping the number of packets in the queue at a minimum level by adjusting a congestion window.

21. A method as recited in claim 20, further comprising:
   reducing the congestion window if the queue length increases; and
   increasing the congestion window if the queue length decreases.

22. A TCP-based congestion management protocol for a wireless data connection, comprising:
   monitoring changes in a length of a transmission queue in a data connection over an interval substantially equal to amount of time it takes to transmit a window of data packets and receive acknowledgements corresponding to all data packets transmitted in the window;
   designating packet loss as being due to congestion if said packet loss is preceded by at least two consecutive intervals of increasing queue length; and
   designating packet loss as random loss if said packet loss is not preceded by at least two consecutive intervals of increasing queue length;
   applying a collision avoidance algorithm if packet loss is designated as due to congestion;
   wherein each said interval comprises the amount of time it takes to transmit a window of data packets and receive acknowledgements corresponding to all data packets transmitted in the window;
   wherein collision avoidance algorithm comprises reducing the sender's transmission window by one-half;
   initializing a state count to zero;
   transitioning from a state count zero to state count one if the length of said queue increases during the next interval;
   transitioning from the state count one to state count zero if the length of said queue decreases or remains steady during next subsequent interval;
   transitioning from a state count one to state count two if the length of said queue increases during the next subsequent interval; and
   designating packet loss as due to congestion if state count two is reached.

23. A protocol as recited in claim 22, further comprising determining whether congestion is developing in the forward or reverse path of the connection.

24. A protocol as recited in claim 23, further comprising isolating forward throughput from congestion on the reverse path.

25. A protocol as recited in claim 24, wherein congestion is determined by calculating the relative delay that one packet experiences with respect to another as it traverses the connection.

26. A protocol as recited in claim 25, wherein said relative delay is used to estimate the number of packets residing the in the queue.

27. A protocol as recited in claim 26, further comprising keeping the number of packets in the queue at a minimum level by adjusting a congestion window.

28. A protocol as recited in claim 27, further comprising:
   reducing the congestion window if the queue length increases; and
   increasing the congestion window if the queue length decreases.

29. A method for improving TCP performance over a wireless connection, comprising:
   detecting the initial stages of congestion in the connection, and identifying the direction of the congestion;
   determining whether congestion is developing in the forward or reverse path of the connection;
   isolating the forward throughput from events such as congestion that may occur on the reverse path;
   determining congestion by calculating the relative delay that one packet experiences with respect to another as it traverses the network;
   using said relative delay to estimate the number of packets residing in a bottleneck queue;
   keeping the number of packets in the bottleneck queue at a minimum level by adjusting the TCP source's congestion window;
   reducing the congestion window if the bottleneck queue length increases; and increasing the congestion window when the source detects additional bandwidth availability in the connection.

* * * * *